May 12, 1959 T. R. DUNCAN 2,886,328

PHONOGRAPH REPEAT MECHANISM

Filed June 11, 1953

INVENTOR

THEODORE R. DUNCAN

BY

Mason & Graham

ATTORNEYS

United States Patent Office 2,886,328

Patented May 12, 1959

2,886,328

PHONOGRAPH REPEAT MECHANISM

Theodore R. Duncan, North Hollywood, Calif., assignor of twenty-six percent to Golda A. Duncan, twenty-four percent to Theodore Roger Duncan, and twenty-four percent to Alan C. Duncan, North Hollywood, Calif.

Application June 11, 1953, Serial No. 360,984

4 Claims. (Cl. 274—15)

This invention has to do with phonograph repeat or reset mechanisms for returning the sound pickup or tone arm to the original or play-beginning position from the play-ending position thereof. The invention is particularly adapted for use with the type of phonograph disclosed in my copending application for patent entitled "Phonograph and Tone Arm," filed April 13, 1953, Serial No. 348,515, but has other applications.

It is an object of my invention to provide an extremely simple means for automatically returning the tone arm of a phonograph to the play-beginning portion of the record after the tone arm has traversed the grooved area of the record to or beyond the playing-end portion.

It is a particular object to provide mechanism of the type indicated which is cheap to manufacture and incorporate into a phonograph device, particularly miniature phonographs such as are adaptable for use in toys and the like.

A further object of the invention is to provide a repeat mechanism of the type indicated for incorporation in phonographs where a single record is repeatedly played. In this connection it is an object to provide a repeat mechanism or tone arm return means which mounts directly on the phonograph record or on the turntable therefor.

These and other objects will be apparent from the drawing and the following description. Referring to the drawings.

Figure 1:
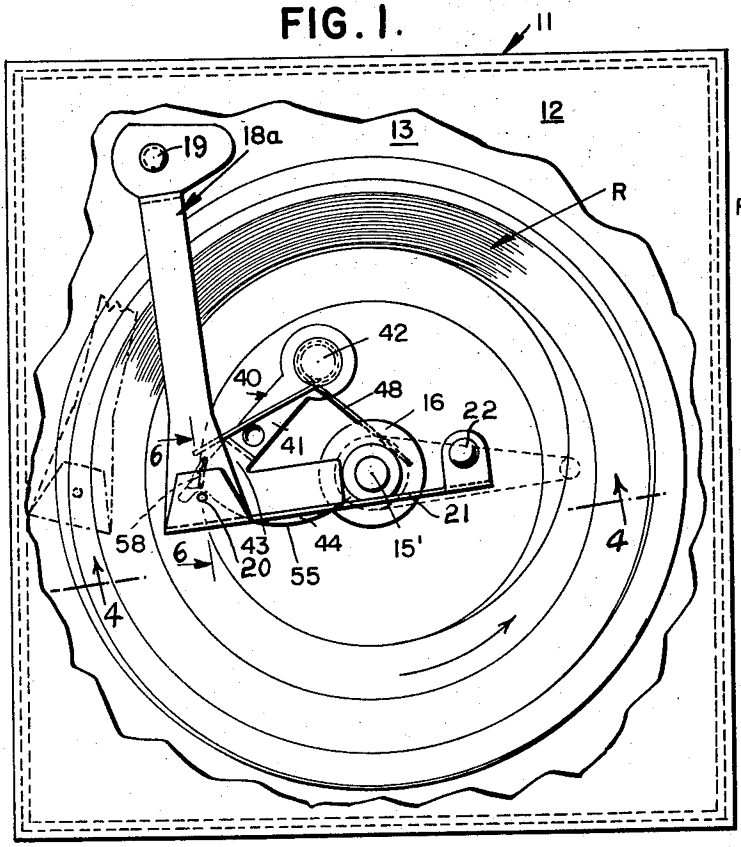
Fig. 1 is a plan view illustrating a phonograph embodying the invention, the cover being broken away.

More particularly describing the invention, referring first to Figs. 1–6, I show a casing or box structure 11 which houses the moving parts of the phonograph. This comprises an upper portion 12 and a lower portion 13. The construction of the phonograph is substantially the same as one disclosed in my above-referred-to copending application for patent and therefore will not be described in detail herein. In general, the phonograph includes a record disk R which is mounted on a spindle 15' journaled in the bottom portion 13 of the box. A washer-type fastener 16 receives the record. A crank 17 attached to the spindle is used for rotating the record. Within the box is a tone arm **18*a* which is pivotally secured to the lower portion 13 of the box by a rivet or pin 19**.

The tone arm carries a depending needle 20 and also has a laterally extending lever portion 21, the end portion 22 of which engages the top of the box, the latter acting as a diaphragm. The arm is limited in its movement outwardly of the record by the side of the box.

I provide a reset mechanism which includes a spring-biased lever 40 having a base 41 apertured at its end to receive a mounting pin or rivet 42 carried by the record disk R. The lever 40 is stepped in the region 43 and is provided with a needle or tone arm engaging portion at 44 which is disposed in a plane above the portion 41 such that its longitudinal axis forms an acute angle with the portion 41. Lever 40 is yieldably urged to a normal position of engagement of the end of portion 44 with the record spindle 15', which in this form of the invention is considerably higher than the record spindle 15 previously described, by a wire spring 48 having legs 49 and 50 and one or more turns 52 intermediate the legs around the mounting pin 42. Leg 49 of the spring is anchored under the record-holding washer 16 and the other leg of the spring bears against the stepped portion 43 of the lever 40.

Lever 40 has a convexly arcuate forward edge 55 and a recessed edge portion or interruption 56 for engagement with and holding of the tone arm needle. The portion of the lever adjacent the edge 56 may be downwardly inclined as shown.

On the tone arm designated **18*a*, I provide a depending tab 58 between the needle and the pivoted end of the arm. The tab has an inclined cam face 59 which is first engaged by lever 40** in the operation of the device for the purpose of raising the tone arm and needle prior to returning the tone arm to the play-beginning position.

Figure 5:
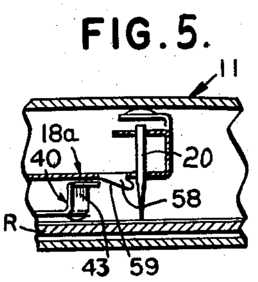
Fig. 5 is a fragmentary sectional view substantially in the plane designated 6—6 on Fig. 1, but showing the parts separated as they appear just before the record disc reaches the position of Fig. 1.
Figure 6:
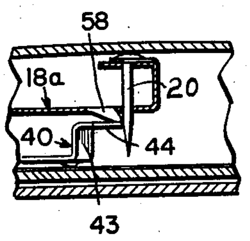
Fig. 6 is a fragmentary section on line 6—6 of Fig. 1.
Figure 2:
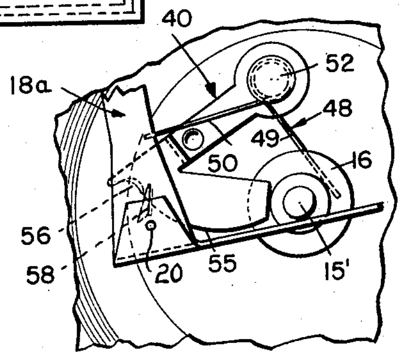
Fig. 2 is a fragmentary plan view of the parts of the invention shown as the repeat mechanism engages the tone arm.
Figure 3:
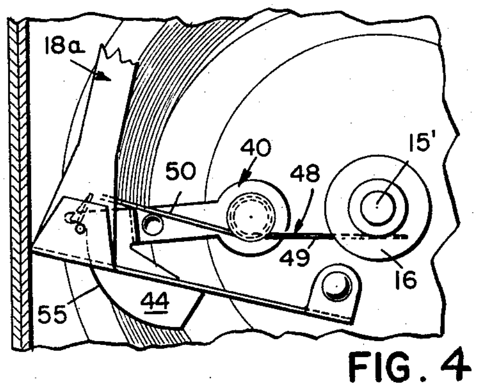
Fig. 3 is a view similar to Fig. 2 but showing the tone arm returned to its original position.
Figure 4:
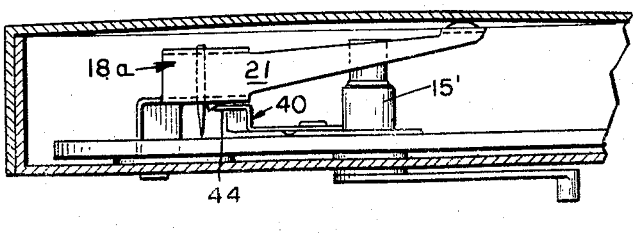
Fig. 4 is a fragmentary sectional view on line 4—4 of Fig. 1.

In the operation of the device, lever 40 and associated parts rotate with the record. When the tone arm **18*a* progresses inwardly into the path of the lever, it is raised as the edge portion 56 of lever 40 engages the cam face 59 of the tone arm and subsequently the needle is engaged and held by the edge 56. This is shown in Figs. 5 and 6. Should the tone arm move inwardly of the record beyond the path of the edge 56, it will be cammed outwardly by the curved edge surface 55 of the lever 40 as shown in Fig. 2. Once the needle has been engaged by the lever 40 as shown in Fig. 1, rotation of the record causes the lever to swing outwardly as shown in Fig. 3, moving the tone arm outwardly until it engages the side of the box (Fig. 3). Further rotation of he record will swing the lever 40 sufficiently to cause it to release from the needle, and it will then snap back to its original position under the influence of the spring 48**.

One of the features of the lever 40 is that should the record be rotated backwards, or in a direction clockwise as viewed in Fig. 1, and the tone arm and needle be within the path of the lever 40, no harm will result, since the lever 40 will serve to sweep the tone arm outwardly.

Also, it should be pointed out that I prefer to provide means for limiting the pivotal movement of the tone arm inwardly of the record, and this can readily be accomplished by extending the spindle 15' far enough to form a stop for the tone arm. It will be apparent from Figs. 1 and 2 that the tone arm **18*a*** cannot move inwardly beyond the position in which it is shown in Fig. 2 due to abutment with the side of the spindle.

Although I have illustrated and described a preferred form of my invention, I contemplate that various changes and modifications can be made without departing from the invention, the scope of which is indicated by the following claims.

I claim:

1. In phonograph construction, a housing including a base, a resilient diaphragm, wall means supporting said diaphragm in spaced opposed relationship to said base;

a spindle rotatably carried by said base and extending into said housing, a sound record disc carried by said spindle within said housing and having a sound record groove defining a play area, said spindle having a portion projecting above the plane of the top surface of said disc within said housing; a sound pickup including an elongated tone arm carrying a disc engaging needle at its outer end portion, means pivotally securing the inner end portion of said arm to said base at a point radially spaced from the periphery of said disc, said arm being swingable over the top face of said disc and having an extension portion frictionally slideably engaging said diaphragm, and said diaphragm and said tone arm cooperating to yieldably urge said tone arm towards said disc; and tone arm resetting means operable automatically in response to rotation of said disc sequentially to lift said tone arm sufficiently to disengage said needle from said disc, then to engage the side surface of said needle, then to swing said tone arm outwardly into re-set position and then to release said tone arm whereby to permit said needle to reengage said disc, including a pair of integral, angularly disposed arms defining a substantially V-shaped needle engaging lever, the first of said arms being pivotally secured at its inner end to said disc at a point spaced between said spindle and said play area, and the second of said arms extending angularly toward said spindle from the outer end portion of said first arm; spring means engaging said lever and urging the latter into position engaging the outer end portion of said second arm with said projecting portion of said spindle, said lever having an outer edge presenting an interruption in the region of the apex of said lever which interruption engages and releasably retains said needle, and cooperating cam and cam engaging means carried by said tone arm and said lever and operative, in response to said rotation of said disc and independently of engagement with said needle, to lift said tone arm sufficiently to disengage said needle from said disc before said lever engages said needle.

2. In phonograph construction, a housing including a base, a resilient diaphragm, wall means supporting said diaphragm in spaced opposed relationship to said base; a spindle rotatably carried by said base and extending into said housing, a sound record disc carried by said spindle within said housing and having a sound record groove defining a play area, said spindle having a portion projecting above the plane of the top surface of said disc within said housing; a sound pickup including an elongated tone arm carrying a disc-engaging needle at its outer end portion, means pivotally securing the inner end portion of said arm to said base at a point radially spaced from the periphery of said disc, said arm being swingable over the top face of said disc and having an extension portion frictionally slideably engaging said diaphragm, and said diaphragm and said tone arm cooperating to yieldably urge said tone arm towards said disc; and tone arm resetting means operable automatically in response to rotation of said disc sequentially to lift said tone arm sufficiently to disengage said needle from said disc, then to engage the side surface of said needle then to swing said tone arm outwardly into re-set position and then to release said tone arm whereby to permit said needle to reengage said disc, including a lever, pivot means connecting said lever to said disc at a point spaced between said spindle and said play area, said lever having, at a point laterally spaced from said pivot means, a side portion disposed for abutting engagement with the projecting portion of said spindle and having a needle-engaging leading edge surface, facing in the direction of rotation of said disc, whose inner end terminates adjacent said side portion and whose outer end portion presents an interruption disposed to engage and releasably retain said needle, spring means engaging said lever and urging the same into position with said side portion abutting said projecting portion of said spindle, and cooperating cam and cam engaging means carried by said tone arm and said lever and operative, in response to said rotation of said disc and independently of engagement with said needle, to lift said tone arm sufficiently to disengage said needle from said disc before said lever engages said needle.

3. The device of claim 2 wherein said cam means is carried by and depends below the bottom surface of said tone arm at a point between the inner end of said tone arm and said needle, and wherein said cam engaging means comprises a portion of said lever elevated above the plane of the inner end portion of said first arm.

4. The device of claim 2 wherein said outer edge of said lever is curved towards said interruption whereby to guide said needle to said interruption.

References Cited in the file of this patent

UNITED STATES PATENTS

| | | |
|---|---|---|
| 639,452 | Smallwood | Dec. 19, 1899 |
| 1,318,104 | O'Rear | Oct. 7, 1919 |
| 1,407,090 | Shaw | Feb. 21, 1922 |
| 2,265,490 | O'Rear | Dec. 9, 1941 |
| 2,369,938 | Barnes | Feb. 20, 1945 |

FOREIGN PATENTS

| | | |
|---|---|---|
| 234,214 | Great Britain | May 28, 1925 |
| 19,082 | Sweden | Mar. 11, 1905 |
| 963,740 | France | July 19, 1950 |